(12) United States Patent
Khattak et al.

(10) Patent No.: US 12,493,741 B2
(45) Date of Patent: Dec. 9, 2025

(54) MULTI-MODAL PROMPT LEARNING FOR REPRESENTATION TRANSFER ON IMAGE RECOGNITION TASKS

(71) Applicant: Mohamed bin Zayed University of Artificial Intelligence, Abu Dhabi (AE)

(72) Inventors: Muhammad Uzair Khattak, Abu Dhabi (AE); Hanoona Abdul Rasheed Bangalath, Abu Dhabi (AE); Muhammad Maaz, Abu Dhabi (AE); Salman Khan, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 303 days.

(21) Appl. No.: 18/090,010

(22) Filed: Dec. 28, 2022

(65) Prior Publication Data

US 2024/0220722 A1 Jul. 4, 2024

(51) Int. Cl.
*G06F 40/284* (2020.01)
*G06F 40/126* (2020.01)

(52) U.S. Cl.
CPC .......... *G06F 40/284* (2020.01); *G06F 40/126* (2020.01)

(58) Field of Classification Search
CPC ............................. G06F 40/284; G06F 40/126
See application file for complete search history.

(56) References Cited

U.S. PATENT DOCUMENTS

| | | | |
|---|---|---|---|
| 2021/0110432 A1* | 4/2021 | Chen | G06F 16/2237 |
| 2021/0232773 A1 | 7/2021 | Wang et al. | |
| 2023/0067528 A1* | 3/2023 | Guo | G06N 3/0895 |
| 2023/0102428 A1* | 3/2023 | Oktay | G06F 40/30 |
| | | | 382/128 |

(Continued)

FOREIGN PATENT DOCUMENTS

| | | |
|---|---|---|
| CN | 113792112 A | 12/2021 |
| CN | 115311389 A | 11/2022 |
| KR | 10-2022-0147550 A | 11/2022 |

OTHER PUBLICATIONS

Bahng et al "Exploring Visual Prompts for Adapting Large-Scale Models" arXiv:2203.17274v2 [cs.CV] (Year: 2022).*

(Continued)

*Primary Examiner* — Darioush Agahi
(74) *Attorney, Agent, or Firm* — Oblon, McClelland, Maier & Neustadt, L.L.P.

(57) ABSTRACT

A method and system for multi-modal prompt learning of vision-language models. Encodings of image-text pairs can be combined with image prompts and text prompts before being input into an image encoder and text encoder of a vision-language model respectively. The image prompt can be generated using the text prompt using a vision-language coupling function to encourage synergy between the two prompts. The combination of encodings and prompts can be fed through the transformer layers of the encoders, and the output of each layer can be combined with a new prompt before entering the next layer, up until a specific depth. The subsequent transformer layers can process the output and (Continued)

generate a final representation for the image and text which can then be used for downstream tasks.

18 Claims, 13 Drawing Sheets

(56) References Cited

U.S. PATENT DOCUMENTS

| | | | | |
|---|---|---|---|---|
| 2023/0162490 A1* | 5/2023 | Zhang | .................. | G06F 40/166 |
| | | | | 382/159 |
| 2024/0119077 A1* | 4/2024 | Gao | ..................... | G06N 3/0455 |
| 2024/0144651 A1* | 5/2024 | Bulat | .................. | G06V 10/776 |

OTHER PUBLICATIONS

Tianyi Liu, et al., "Unified Multimodal Pre-training and Prompt-based Tuning for Vision-Language Understanding and Generation", Computer Vision and Pattern Recognition (cs.CV); Computation and Language (cs.CL); Machine Learning (cs.LG), arXiv:2112.05587v2 [cs.CV], Dec. 10, 2021, pp. 1-13.

* cited by examiner (a) Average over 11 datasets

|  | Base | Novel | HM |
|---|---|---|---|
| CLIP | 69.34 | 74.22 | 71.70 |
| CoOp | 82.69 | 63.22 | 71.66 |
| Co-CoOp | 80.47 | 71.69 | 75.83 |
| MaPLe | 82.28 | 75.14 | 78.55 |
|  | +1.81 | +3.45 | +2.72 |

(b) ImageNet.

|  | Base | Novel | HM |
|---|---|---|---|
| CLIP | 72.43 | 68.14 | 70.22 |
| CoOp | 76.47 | 67.88 | 71.92 |
| Co-CoOp | 75.98 | 70.43 | 73.10 |
| MaPLe | 76.66 | 70.54 | 73.47 |
|  | +0.68 | +0.11 | +0.37 |

(c) Caltech101

|  | Base | Novel | HM |
|---|---|---|---|
| CLIP | 96.84 | 94.00 | 95.40 |
| CoOp | 98.00 | 89.81 | 93.73 |
| Co-CoOp | 97.96 | 93.81 | 95.84 |
| MaPLe | 97.74 | 94.36 | 96.02 |
|  | −0.22 | +0.55 | +0.18 |

(d) OxfordPets

|  | Base | Novel | HM |
|---|---|---|---|
| CLIP | 91.17 | 97.26 | 94.12 |
| CoOp | 93.67 | 95.29 | 94.47 |
| Co-CoOp | 95.20 | 97.69 | 96.43 |
| MaPLe | 95.43 | 97.76 | 96.58 |
|  | +0.23 | +0.07 | +0.15 |

(e) StanfordCars

|  | Base | Novel | HM |
|---|---|---|---|
| CLIP | 63.37 | 74.89 | 68.65 |
| CoOp | 78.12 | 60.40 | 68.13 |
| Co-CoOp | 70.49 | 73.59 | 72.01 |
| MaPLe | 72.94 | 74.00 | 73.47 |
|  | +2.45 | +0.41 | +1.46 |

(f) Flowers102

|  | Base | Novel | HM |
|---|---|---|---|
| CLIP | 72.08 | 77.80 | 74.83 |
| CoOp | 97.60 | 59.67 | 74.06 |
| Co-CoOp | 94.87 | 71.75 | 81.71 |
| MaPLe | 95.92 | 72.46 | 82.56 |
|  | +1.05 | +0.71 | +0.85 |

FIG. 5

(g) Food101

|       | Base  | Novel | HM    |
|-------|-------|-------|-------|
| CLIP  | 90.10 | 91.22 | 90.66 |
| CoOp  | 88.33 | 82.26 | 85.19 |
| Co-CoOp | 90.70 | 91.29 | 90.99 |
| MaPLe | 90.71 | 92.05 | 91.38 |
|       | +0.01 | +0.76 | +0.39 |

(h) FGVCAircraft

|       | Base  | Novel | HM    |
|-------|-------|-------|-------|
| CLIP  | 27.19 | 36.29 | 31.09 |
| CoOp  | 40.44 | 22.30 | 28.75 |
| Co-CoOp | 33.41 | 23.71 | 27.74 |
| MaPLe | 37.44 | 35.61 | 36.50 |
|       | +4.03 | +11.90 | +8.76 |

(i) SUN397

|       | Base  | Novel | HM    |
|-------|-------|-------|-------|
| CLIP  | 69.36 | 75.35 | 72.23 |
| CoOp  | 80.60 | 65.89 | 72.51 |
| Co-CoOp | 79.74 | 76.86 | 78.27 |
| MaPLe | 80.82 | 78.70 | 79.75 |
|       | +1.08 | +1.84 | +1.48 |

(j) DTD

|       | Base  | Novel | HM    |
|-------|-------|-------|-------|
| CLIP  | 53.24 | 59.90 | 56.37 |
| CoOp  | 79.44 | 41.18 | 54.24 |
| Co-CoOp | 77.01 | 56.00 | 64.85 |
| MaPLe | 80.36 | 59.18 | 68.16 |
|       | +3.35 | +3.18 | +3.31 |

(k) EuroSAT

|       | Base  | Novel | HM    |
|-------|-------|-------|-------|
| CLIP  | 56.48 | 64.05 | 60.03 |
| CoOp  | 92.19 | 54.74 | 68.69 |
| Co-CoOp | 87.49 | 60.04 | 71.21 |
| MaPLe | 94.07 | 73.23 | 82.35 |
|       | +6.58 | +13.19 | +11.14 |

(l) UCF101

|       | Base  | Novel | HM    |
|-------|-------|-------|-------|
| CLIP  | 70.53 | 77.50 | 73.85 |
| CoOp  | 84.69 | 56.05 | 67.46 |
| Co-CoOp | 82.33 | 73.45 | 77.64 |
| MaPLe | 83.00 | 78.66 | 80.77 |
|       | +0.67 | +5.21 | +3.13 |

FIG. 5 (Cont'd)

MULTI-MODAL PROMPT LEARNING FOR REPRESENTATION TRANSFER ON IMAGE RECOGNITION TASKS

STATEMENT REGARDING PRIOR DISCLOSURE BY THE INVENTORS

Aspects of the present disclosure are described in M. Khattak, H. Rasheed, M. Maaz, S. Khan, F. Khan, "MaPLe: Multi-modal Prompt Learning," in arXiv:2210.03117, October 2022, doi: 10.48550/arXiv.2210.03117, which incorporated here by reference in its entirety.

BACKGROUND

Technical Field

The present disclosure relates to a system and method for multi-modal prompt learning for vision and language branches of a vision-language model.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Pre-trained vision-language models, such as Contrastive Language-Image Pre-training (CLIP), have excellent generalization ability for use in downstream tasks. Such models are trained to align vision and language modalities on web-scale data (e.g., CLIP has common use in training on data comprising 400 million text-image pairs). The resulting trained model can reason about open vocabulary visual concepts due to supervision provided by natural language. During inference, text prompts are used, such as "a photo of a <category>" as a query for a text encoder. The output text embeddings of the text encoder are then matched with the visual embeddings from an image encoder to predict the output class.

Although pre-trained vision-language models are effective towards generalization to new concepts, the scale and scarcity of training data (e.g., in the few-shot use case) makes it infeasible to fine-tune the model for downstream tasks. Fine-tuning can also cause the model to forget useful knowledge that it acquired in the large-scale pretraining phase and poses a risk of overfitting the model to the downstream task. To address these and other challenges, many current methods aim to use prompt learning solely for text encoders and ignore the image encoder. Such approaches use prompting to adapt representations in a single branch (i.e., only vision or only language) which leads to low flexibility in dynamically adjusting both vision and language representation spaces on a downstream task. Additional problems arise due to their sensitivity in the choice of input text prompts and require a careful selection of prompt templates to perform well. Some recent CLIP adaptation approaches aim to learn prompts as textual inputs to fine-tune CLIP for generalized downstream tasks. Accordingly, it is one object of the present disclosure to provide methods and systems for multi-modal training of pre-trained vision-language models.

SUMMARY

In an exemplary embodiment, a multi-modal prompt learning method is performed. The method includes generating a plurality of learnable text prompt tokens. The text of the image-text pair can then be input into the text encoder of a neural network, wherein the text is tokenized and projected to a plurality of word embeddings. The text encoder can then output a final text representation of the input text and the plurality of learnable text prompt tokens. The method can then include generating a plurality of learnable image prompt tokens using the plurality of learnable text prompt tokens. The image of the image-text pair can then be input into the image encoder of the neural network, wherein the image is split into a plurality of patch embeddings and a learnable class token is appended to the plurality of patch embeddings. The image encoder can then output a final image representation of the input image and the plurality of learnable text prompt tokens. The method can then include using the final text representation and the final image representation to complete a downstream task.

In another exemplary embodiment, a non-transitory computer readable medium having instructions stored therein that, when executed by one or more processors, cause the one or more processors to perform a method of generating a plurality of learnable text prompt tokens; inputting the text of an image-text pair into a text encoder, wherein the text encoder is a part of a neural network, wherein the text is tokenized and projected to a plurality of word embeddings, and wherein the text encoder outputs a final text representation of the input text and plurality of learnable text prompt tokens; generating a plurality of learnable image prompt tokens using the plurality of learnable text prompt tokens; inputting the image of the image-text pair into an image encoder, wherein the image encoder is a part of the neural network, wherein the image is split into a plurality of patch embeddings, wherein a learnable class token is appended to the plurality of patch embeddings, and wherein the image encoder outputs a final image representation of the input image and the plurality of learnable text prompt tokens; and using the final text representation and the final image representation to complete a downstream task.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5 shows several tables depicting the performance of the multi-modal prompt learning against current methods in base-to-novel generalization, according to certain embodiments.

DETAILED DESCRIPTION

Figure 1A:
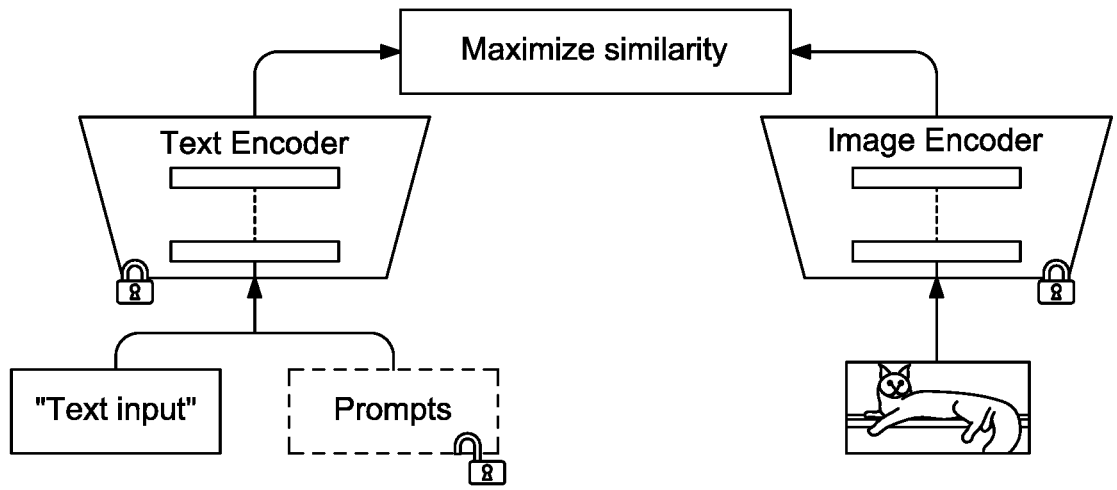
FIG. 1A is an exemplary block diagram of existing prompt tuning methods.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for multi-modal prompt learning for vision and language branches of a vision-language model. Embodiments use multi-modal prompt learning to align vision-language representations of vision-language models. Vision-language models can be implemented as neural networks. For example, a general vision-language model can be a neural network that obtains an image-text pair and transforms then into image-text embeddings that are trained. In particular, embodiments can be applied to CLIP for multi-modal prompting for fine-tuning of the CLIP. In order to link prompts learned in image and text encoders, embodiments use a coupling function to condition vision prompts based on their text counterparts. The link acts as a bridge between the two modalities and allows for mutual propagation of gradients to promote mutual synergy. Embodiments learn multi-modal prompts across multiple transformer blocks in both vision and language branches to progressively learn the synergistic behavior of both modalities, which allows for the modeling of contextual relationships independently and provides for more flexibility to align the vision-language representations. The difference in approaches between multi-modal prompting can be seen in reference to FIGS. 1A and 1B.

Figure 1B:
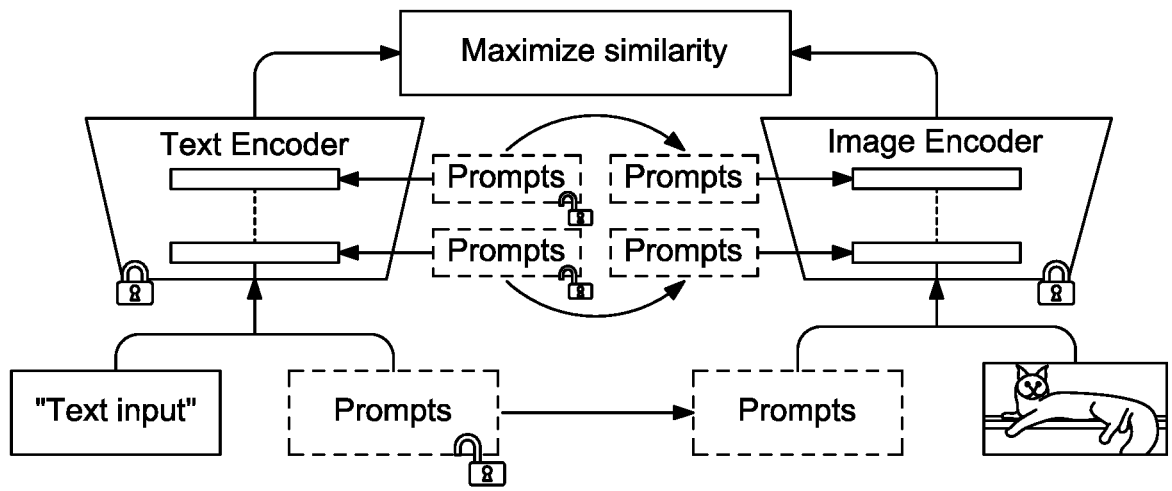
FIG. 1B is an exemplary block diagram of multi-modal prompt learning, according to certain embodiments.

FIG. 1A is an exemplary block diagram of existing prompt tuning methods. In such approaches, uni-modal training is used. Prompts are learned only in a single branch of a vision-language model. FIG. 1B is an exemplary block diagram of multi-modal prompt learning, according to certain embodiments. Multi-modal prompt learning introduces branch-aware hierarchical prompts that adapt both language and vision branches simultaneously for improved generalization.

Embodiments provide for a number of advantages. Embodiments improve alignment between the vision and language representations of vision-language models. A strong coupling between vision-language prompts is promoted by multi-modal learning, helping to ensure mutual synergy and discouraging learning independent uni-modal solutions.

Figure 2:
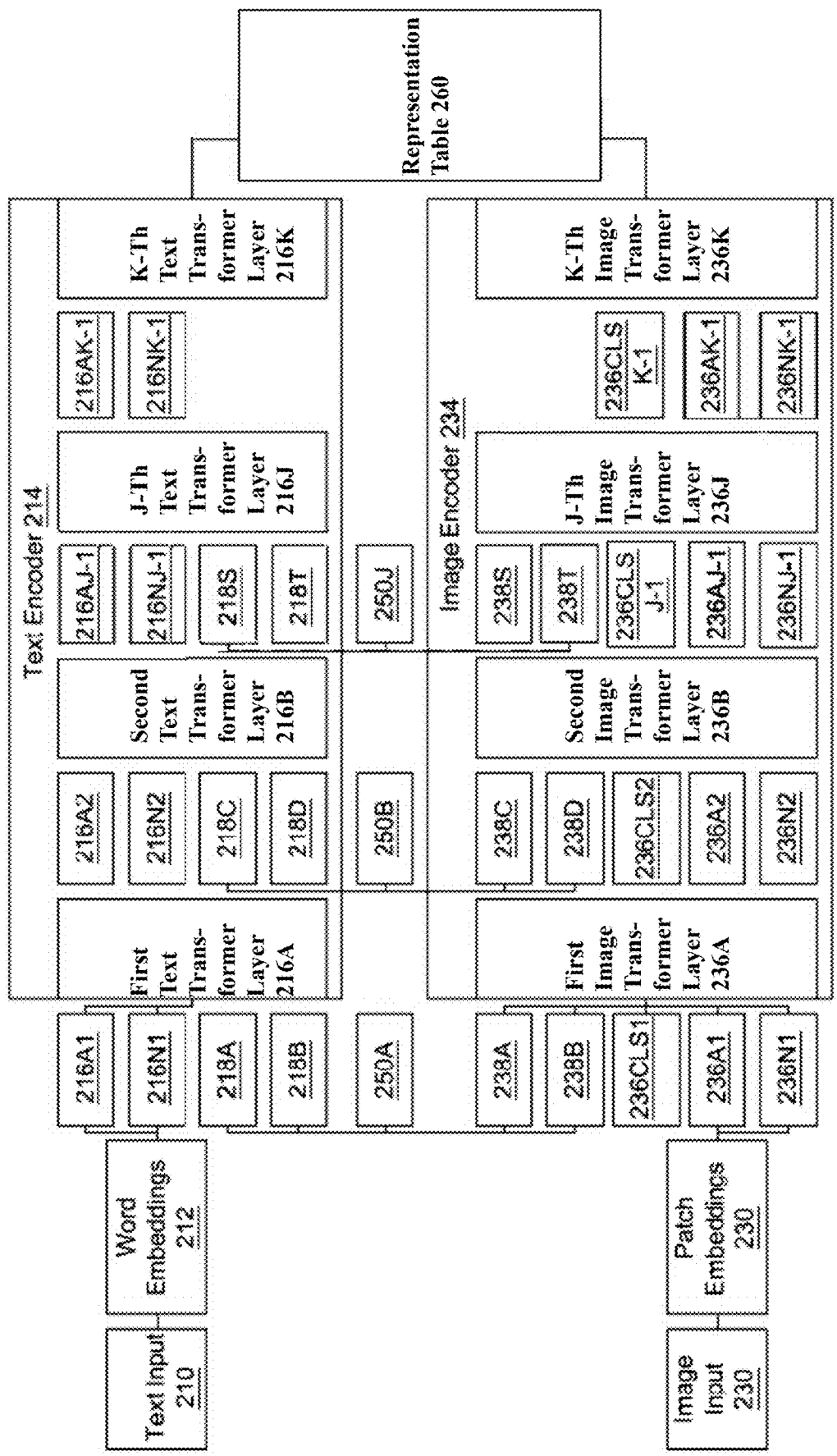
FIG. 2 is an exemplary block diagram of a multi-modal prompt learning framework according to certain embodiments.

In prompt learning, an instruction is received in the form of a sentence known as a text prompt. The text prompt is provided to the language branch of a vision-language model and will allow it to better understand the task at hand. Embodiments fine-tune a pretrained multi-modal vision-language model, such as CLIP, for better generalization to downstream tasks through context optimization via prompting. FIG. 2

FIG. 2 is an exemplary block diagram of a multi-modal prompt learning framework 200 (MaPLe) according to certain embodiments. The multi-modal prompt learning framework 200 comprises a language branch formed by a text input 210, a word embedding 212, and a text encoder 214. The text encoder 214 can comprise a first text transformer layer 216A, a second text transformer layer 216B, a J-th text transformer layer 216J, and a K-th text transformer layer 216K. The multi-modal prompt learning framework 200 additionally comprises a vision branch formed by an image input 230, a patch embedding 232, and an image encoder 234. The image encoder 234 can comprise a first image transformer layer 236A, a second image transformer layer 236B, a J-th image transformer layer 236J, and a K-th image transformer layer 236K. The multi-modal prompt learning framework 200 additionally includes a first coupling function 250A, a second coupling function 250B, and a J-th coupling function 250J, along with a plurality of context learnable text prompt tokens 218A-218T and a plurality of context learnable image prompt tokens 238A-238T. Each of the first coupling function 250A, the second coupling function 250B, and the J-th coupling function 250J can be vision-to-language projection coupling functions and can be the same or similar vision-to-language coupling function.

The multi-modal prompt learning framework 200 can fine-tune both the language and vision branches where only learnable prompt tokens (e.g., the learnable text prompt tokens 218A-218T and the learnable image prompt tokens 238A-238T) are learned, while the other parts of the model are frozen. The multi-modal prompt learning framework 200 conditions vision prompts on language prompts via the vision-language coupling functions 250A, 250B, and 250J.

In the language branch, the text input 210 can be tokenized and projected to a total of N word embeddings 216A1-216M1. Each of the N total word embeddings 216A1-216M1 can be input to the first text transformer layer 216A. In addition, learnable text prompt tokens 218A, 238B are introduced to the vision branch of the multi-modal prompt learning framework 200. Although FIG. 2 shows two learnable text prompt tokens, any number of learnable text prompt tokens can be introduced into the vision branch. The word embeddings 216A1-216M1 can be concatenated with the learnable text prompt tokens 218A and 218B. New learnable text prompt tokens are further introduced at each text transformer layer of the text encoder 214, up to some specific depth J<K. The output of the first text transformer layer 216A can be a modified set of word embeddings 216A2-216M2 and can be input to the second text transformer layer 216B along with learnable text prompt tokens 218C and 218D. This pattern of inputting word embeddings into a transformer layer that outputs modified word embeddings, and combining the modified patch embeddings with new learnable text prompt tokens can continue up until the specific depth J. This can be described by the following equation:

$$[o, W_i] = \mathcal{L}_i([P_{i-1}, W_{i-1}) \ i = 1, 2, \ldots, J$$

where $W_i$ represents all of the word embeddings of the i-th layer (e.g., all of the word embeddings 216A1-216M1 of the first layer), o is a placeholder, P represents all of the learnable text prompt tokens of the i-th layer (e.g., the learnable text prompt tokens 218A and 218B), and $\mathcal{L}$ represents the text transformer layer.

After the J-th text transformer layer is reached, each subsequent layer can simply process the output of the previous layer without any concatenation of learnable text prompt tokens. This can be described by the following equation:

$$[P_j, W_j] = \mathcal{L}_j([P_{j-1}, W_{j-1}) \ j = J+1, J+2, \ldots, K$$

The last text transformer layer can compute the final text representation by using a text projection function to project the word embeddings. As an example, the following equation can represent the computation of the final text representation:

$$y = TextProjection(w_K^N)$$

where TextProjection( ) represents a function that projects the word embedding to a common vision-learning latent embedding space, $w_k^N$ is the word embedding corresponding to the K-th text transformer layer 216K, and y is the final text representation. The final text representation can be stored in a representation table 260.

In the vision branch, the image input 230 can be split to a total of M patch embeddings 236A1-236M1. Each of the M total patch embeddings 236A1-236M1 along with an appended learnable class token 236CLS1 can be input to the first image transformer layer 236A. In addition, learnable image prompt tokens 238A, 238B are introduced to the language branch of the multi-modal prompt learning framework 200. Although FIG. 2 shows two learnable image prompt tokens, any number of learnable image prompt tokens can be introduced into the language branch.

To simultaneously adapt both the vision and language branches of the vision-language model, the prompts are shared across both modalities. A learnable text prompt token (e.g., 218A and 218B) can be projected a to learnable image prompt token (e.g., 238A and 238B) via the vision-to-language projection coupling functions 250A-250J. The vision-to-language projection coupling functions can be implemented as a linear layer that maps inputs of a first dimensionality $d_l$ to outputs of a second, different, dimensionality $d_v$ (i.e., $d_l \neq d_v$). As such, a notation for the vision-coupling function $\mathcal{F}(\ )$ is used. The learnable image prompt tokens are then described by the following equation:

$$\tilde{P} = \mathcal{F}(P)$$

where P is a learnable text prompt token and $\tilde{P}$ is a learnable image prompt token. Through this implementation, a bridge between the two modalities is formed and encourages the mutual propagation of gradients. The explicit conditioning of $\tilde{P}$ on P helps to learn prompts in a shared embedding space between the language and vision branches, improving mutual synergy.

The patch embeddings 236A1-236M1 and appended learnable class token 236CLS2 can be concatenated with the learnable image prompt tokens 238A and 238B. New learnable image prompt tokens are further introduced at each image transformer layer of the image encoder 234, up to the specific depth J<K (i.e., the same specific depth as that of the language branch). The output of the first image transformer layer 236A can be a modified set of patch embeddings 236A2-236M2 and appended learnable class token 236CLS2 and can be input to the second image transformer layer 236B along with learnable image prompt tokens 238C and 238D. This pattern of inputting patch embeddings and learnable class token combined with learnable image prompt tokens into a transformer layer that outputs modified patch embeddings, and combining the modified patch embeddings with new learnable image prompt tokens can continue up until the specific depth J. This can be described by the following equation:

$$[c_i, E_i, o] = \mathcal{V}_i([c_{i-1}, E_{i-1}, \mathcal{F}_{i-1}(P_{i-1})]) \ i = 1, 2, \ldots, J$$

where $c_i$ represents the learnable class token of the i-th layer, $E_i$ represents all of the patch embeddings of the i-th layer (e.g., all of the patch embeddings 236A1-236M1 of the first layer), o is a placeholder, $\mathcal{V}$. represents the image transformer layer, and remembering that P represents a learnable text prompt token and $\mathcal{F}$ represents the vision-to-language coupling functions 250A-250J.

After the J-th image transformer layer is reached, each subsequent layer can simply process the output of the previous layer without any concatenation of learnable text prompt tokens. This can be described by the following equation:

$$[c_j, E_j, \tilde{P}_j] = \mathcal{V}_j([c_{j-1}, E_{j-1}, \tilde{P}_{j-1}]) \ j = J+1, J+2, \ldots, K$$

The last image transformer layer can compute the final image representation by using an image projection function to project the K-th learnable class token 236CLSK. As an example, the following equation can represent the computation of the final image representation:

$$x = ImageProjection(c_K)$$

where ImageProjection( ) represents a function that projects the class token to a common vision-learning latent embedding space, $c_K$ is the K-th learnable class token corresponding to the K-th image transformer layer 216K, and x is the final image representation. The final image representation can be stored in a representation table 260.

Such a process can be repeated for a plurality of image-text pairs. A resultant final image representation and final text representation for each image-text pair. For example, each image input can have a final image representation $x_i$ and each corresponding text input can have a final text representation $y_i$. The representations of all of the plurality of image-text pairs can then be stored as a part of the representation table 260.

The representation table 260 can be used in downstream tasks, such as in zero-shot classification. In zero-shot classification, text prompts are generated with class labels (e.g., "a photo of a <category>") with a total of C classes. A prediction F corresponding to an image I having a highest cosine similarity score function sim( ) can be formulated as:

$$p(F \mid x) = \exp(sim(x, z_F)/\tau) / \sum_{i=1}^{c} \exp(sim(x, z_i))$$

where $\tau$ is a temperature parameter. The prediction can be used to update the learnable prompts. For example, for known input image-text pairs, the prediction can be compared to a known ground-truth value. The prediction and the ground-truth value can be used as input to a loss function to calculate a loss. Examples of loss functions include cross-entropy and Hinge loss. The gradient of the loss function can be then computed, and backpropagated to update the learnable text prompt tokens and the learnable image prompt tokens. This can result in a better prediction.

Embodiments provide for various improvements. The multi-modal prompt learning framework 200 provides for improvements in computation efficiency both during training and inference without much extra overhead as compared to Co-CoOp. The multi-modal prompt learning framework 200 is tested for base-to-novel class generalization against other methods, including CLIP, CoOp and Co-CoOP.

Figure 3:
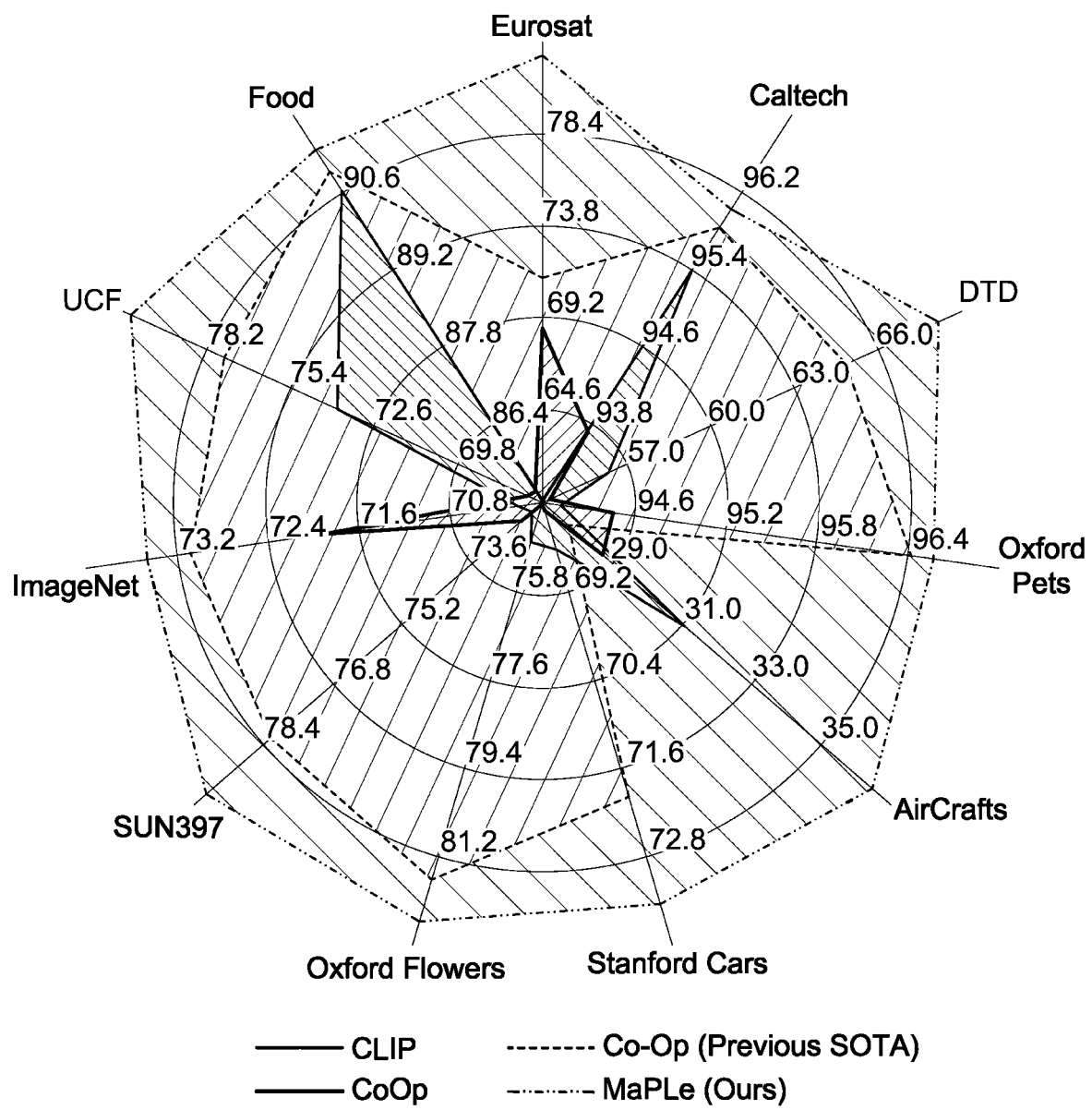
FIG. 3 is a chart of image recognition scores across eleven datasets according to certain embodiments.

FIG. 3 is a chart 300 of image recognition scores across eleven datasets according to certain embodiments. The multi-modal prompt learning framework 200 provides an absolute average gain of 3.45% on novel classes and 2.72% on harmonic-mean over the previous best method of Co-CoOp. Further, the multi-modal prompt learning framework 200 demonstrates favorable generalization ability and robustness is cross-dataset transfer and domain generalization settings, leading to more consistent improvements as compared to the other existing approaches.

Figure 4:
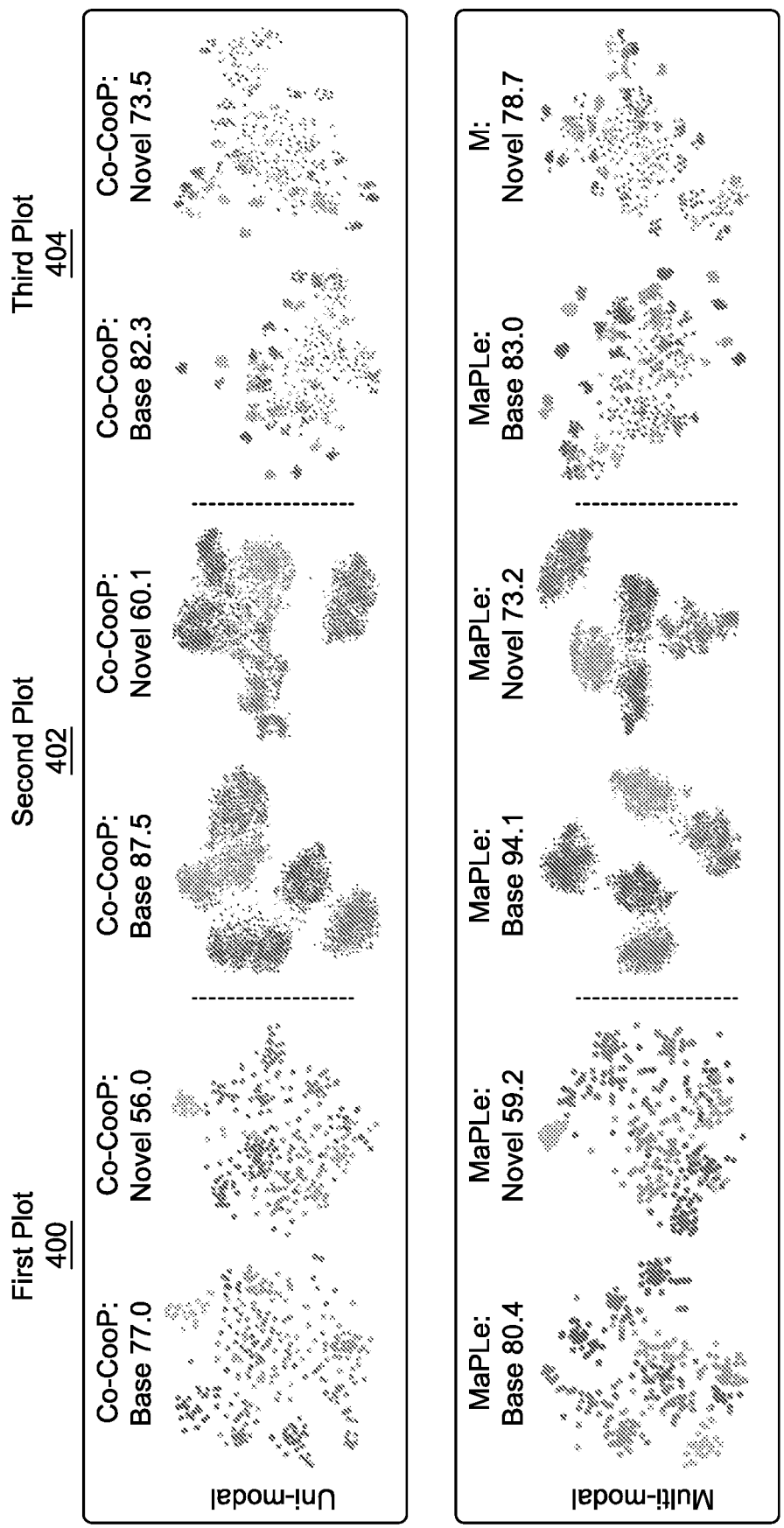
FIG. 4 shows several plots of image embeddings in uni-modal prompting as compared to methods provided by embodiments.

FIG. 4 shows several plots of image embeddings in uni-modal prompting as compared to methods provided by embodiments. The image embeddings generated by the multi-modal prompt learning framework 200 are compared with Co-CoOp. Each of the plots are t-SNE plots of image embeddings of uni-modal prompting provided by Co-CoOp (the image embeddings generated by CLIP, CoOp, and Co-CoOp are identical as neither learn prompts in the vision branch) as compared to the multi-modal prompt learning framework 200. As can be seen from the plots 400-404, the multi-modal prompt learning framework 200 generates image embeddings that are more separable, indicating that learning vision prompts in addition to language prompts leads to a better adaptation of vision-language models. In further analysis, it can be found that it is essential to learn prompts in the deeper transformer layers (e.g., layers beyond the specific depth J) to progressively model stage-wise feature representations. For this reason, learnable tokens are only introduced for the first J transformer layers of both the vision and language branches of the multi-modal prompt learning framework 200.

To further evaluate the multi-modal prompt learning framework 200, several experiments are conducted in three benchmark settings for image recognition. In generalization from base-to-novel classes, a zero-shot setting where the datasets are split into base and novel classes is followed. The vision-language model is trained only on the base classes in a few-shot setting and evaluated is on both base and novel categories. In cross-dataset evaluation, the multi-modal prompt learning framework 200 is trained on 1000 ImageNet classes in a few-shot manner and is then applied directly to other datasets. The ImageNet dataset is described in Jia Deng, Wei Dong, Richard Socher, Li-Jia Li, Kai Li, and Li Fei-Fei, "Imagenet: A large-scale hierarchical image database," in *Proceedings of the IEEE/CVF Conference on Computer Vision and Pattern Recognition*, pp. 248-255. IEEE, 2009, which is wherein incorporated by reference. In domain generalization, the robustness of the multi-modal prompt learning framework 200 is tested on out-of-distribution datasets. Similar to the cross-dataset evaluation, the multi-modal prompt learning framework 200 is trained on ImageNet directly on four other ImageNet datasets that contain various types of domain shifts.

TABLE 1

| Method | Base Acc. | Novel Acc. | Harmonic-Mean |
|---|---|---|---|
| Co-CoOp | 80.47 | 71.69 | 75.83 |
| 1: Deep Vision Prompting | 80.24 | 73.43 | 76.68 |
| 2: Deep Language Prompting | 81.72 | 73.81 | 77.56 |
| 3: Independent V-L Prompting | 82.15 | 74.07 | 77.90 |
| 4: MaPLe | 82.28 | 75.14 | 78.55 |

The above table 1 shows a comparison of the multi-modal prompt learning framework 200 with different deep prompting designs in base-to-novel generalization. The dimensionalities $d_l$=512, $d_v$=768 and $d_{vl}$=512 are chosen. For the multi-modal prompt learning framework 200, the prompt depth K is set to 9 and the language and vision prompt lengths are set to 2. All models are trained for 5 epochs with a batch-size of 4 and a learning rate of 0.0035 via SGD optimizer on a single NVIDIA A100 GPU. The base and novel class accuracies and their harmonic mean (HM) are averaged over 3 runs. The language prompts of the first layer $P_0$ are initialized with the pre-trained CLIP word embeddings of the template "a photo of a <category>", while for the subsequent layers they are randomly initialized from a normal distribution. For the training of the multi-modal prompt learning framework 200 on all 1000 classes of ImageNet as a source model, the prompt depth K is set to 3 and the model trained for 2 epochs with learning rate of 0.0026. The previous best method, Co-CoOp is outperformed by the multi-modal prompt learning framework 200. In Co-CoOp, deep language prompting shows improvements over deep vision prompting, but is further outclassed by separately combining the approaches by independent vision-language prompting. Independent vision-language prompting however has a lack of synergy between the learned vision and language prompts as they do not interact with each other during training. The multi-modal prompt learning framework 200 combines the benefits of prompting in both the vision and language branches by enforcing interactions through explicit condition of vision prompts on the language prompts.

FIG. 5 shows several tables depicting the performance of the multi-modal prompt learning framework 200 against current methods in base-to-novel generalization, according to certain embodiments. In comparison to current methods, the multi-modal prompt learning framework 200 shows improved performance on both base and novel categories on all datasets, with an exception of a marginal reduction on the base class performance of the Caltech 101 dataset. With the mutual synergy provided by the branch-aware multi-modal prompting, the multi-modal prompt learning framework 200 better generalizes to novel categories on all datasets in comparison to the other current methods. An overall gain from 71.69% to 75.14% is obtained, and an absolute average gain of 2.72% is achieved over Co-CoOp.

The poor generalization problem of CoOp is solved by Co-CoOp by explicitly conditioning prompts on image instances and shows significant gains in novel categories. However, on base classes, it only has slight improvements over CoOp on 3/11 of the datasets used in testing. The multi-modal prompt learning framework 200 is tested against a hybrid CoOp approach, inspired by the training strategies of Co-CoOp. The results of the test are summarized by Table 2.

TABLE 2

| Method | Base Acc. | Novel Acc. | Harmonic-Mean |
|---|---|---|---|
| CoOp | 82.69 | 63.22 | 71.66 |
| Co-CoOp | 80.47 | 71.69 | 75.83 |
| CoOp+ | 80.85 | 70.02 | 75.04 |
| MaPLe | 82.28 | 75.14 | 78.55 |

The cross-dataset generalization of the multi-modal prompt learning framework 200 is tested by learning multi-modal prompts on the ImageNet classes, and then transferring the trained model directly to other datasets. The results are summarized in Table 3.

TABLE 3

| | Image Net | Caltech 101 | Oxford Pets | Stanford Cars | Flowers 102 | Food 101 | Aircraft | SUN 397 | DTD | Euro SAT | UFC 101 | Average |
|---|---|---|---|---|---|---|---|---|---|---|---|---|
| CoOp | 71.51 | 93.70 | 89.14 | 64.51 | 68.71 | 85.30 | 18.47 | 64.15 | 41.92 | 46.39 | 66.55 | 63.88 |
| Co-CoOp | 71.02 | 94.43 | 90.14 | 65.32 | 71.88 | 86.06 | 22.94 | 67.36 | 45.73 | 45.37 | 68.21 | 65.74 |
| MaPLe | 70.72 | 93.53 | 90.49 | 65.57 | 72.23 | 86.20 | 24.74 | 67.01 | 46.49 | 48.06 | 68.69 | 66.30 |

As shown in Table 3, on the ImageNet dataset, the multi-modal prompt learning framework 200 demonstrates a greater generalization performance by surpassing CoOp in 9/10 datasets, and Co-CoOp in 8/10 datasets. The multi-modal prompt learning framework 200 achieves the highest average accuracy of 66.30%, which indicates better generalization.

The out-of-distribution ability of the multi-modal prompt learning framework 200 is tested. Specifically, the direct transferability of a multi-modal prompt learning framework 200 ImageNet trained model to various out-of-domain datasets is tested and compared against CoOp and Co-CoOp. The results are summarized in Table 4 below.

TABLE 4

| | ImageNet | ImageNetV2 | ImageNet-Sketch | ImageNet-A | ImageNet-R |
|---|---|---|---|---|---|
| CLIP | 66.73 | 60.83 | 46.15 | 47.77 | 73.96 |
| CoOp | 71.51 | 64.20 | 47.99 | 49.71 | 75.21 |

TABLE 4-continued

| | ImageNet | ImageNetV2 | ImageNet-Sketch | ImageNet-A | ImageNet-R |
|---|---|---|---|---|---|
| Co-CoOp | 71.02 | 64.07 | 48.75 | 50.63 | 76.18 |
| MaPLe | 70.72 | 64.07 | 49.15 | 50.90 | 76.98 |

As seen in Table 4, multi-modal prompt learning framework 200 improves against all of the tested existing approaches, which indicates that the multi-modal branch-aware prompting assists the multi-modal prompt learning framework 200 in enhancing the generalization and robustness of vision-language models, such as CLIP.

Figure 6:
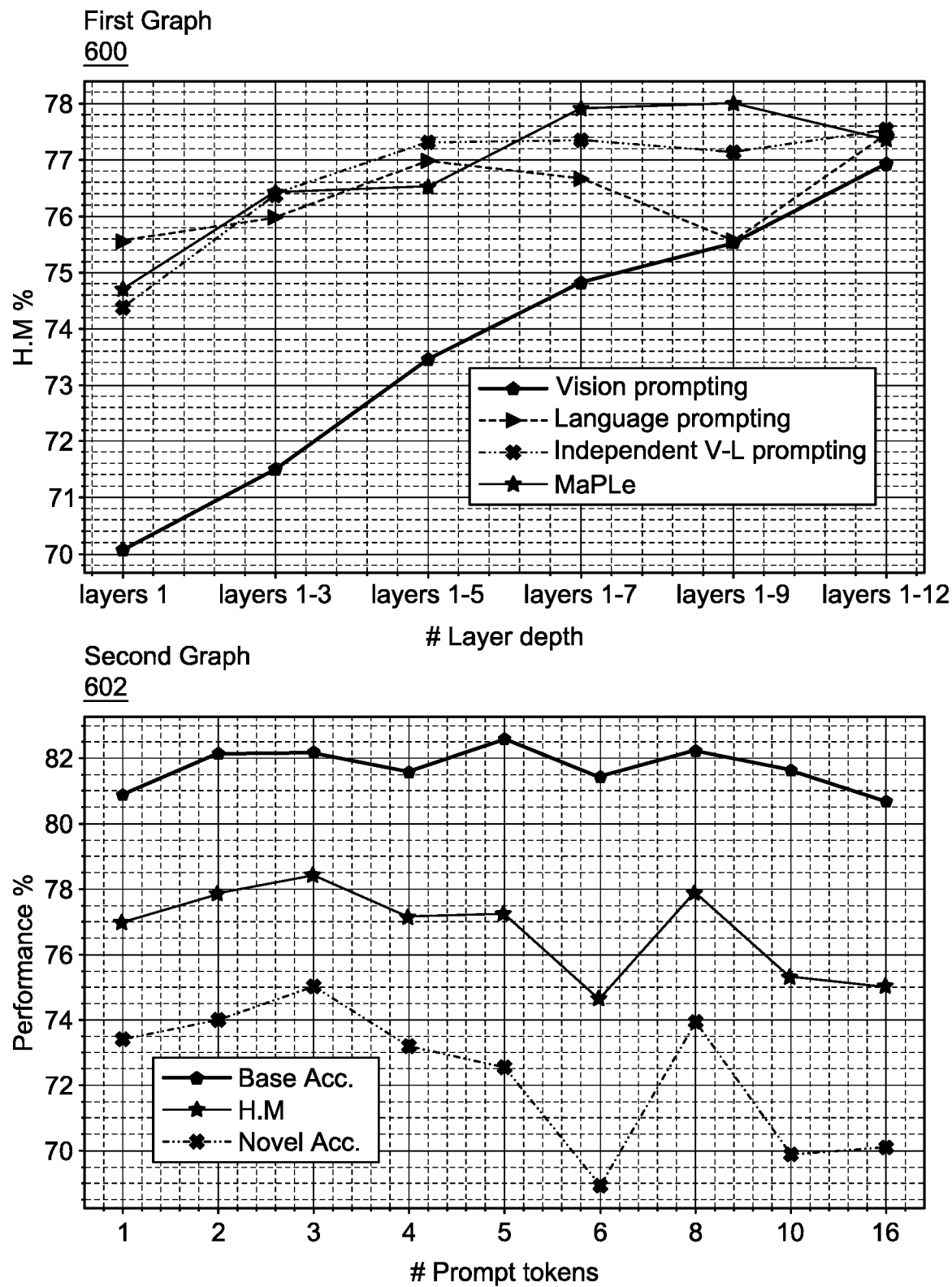
FIG. 6 shows graphs of ablation vs specific depth and ablation vs prompt length, according to certain embodiments.

FIG. 6 shows graphs of ablation vs specific depth and ablation vs prompt length, according to certain embodiments. The effects of changes in specific depth J for the multi-modal prompt learning framework 200 and ablate on the depth of language and vision branches individually. In general, as shown by the first graph 600 the performance improves as the specific depth increases. Alternative methods, such as CoOp and Co-CoOp use shallow language prompting (e.g., a specific depth of 1). The second graph 602 shows the effect of prompt length for the multi-modal prompt learning framework 200. As the prompt length increases, the performance on base classes is generally maintained, while the novel class accuracy decreases, indicating overfitting which hurts the generalization to novel classes.

In addition, the ablation on prompt initialization is tested and results are summarized in Table 5 below.

TABLE 5

| Method | Base Acc. | Novel Acc. | Harmonic Mean |
|---|---|---|---|
| MaPLe: All layers: "a photo of a" | 81.90 | 74.22 | 77.88 |
| MaPLe: Random Initialization | 82.27 | 75.10 | 78.52 |
| Maple: Only first layer: "a photo of a" | 82.28 | 75.14 | 78.55 |

The best performance is achieved when the learnable prompts in the first layer are initialized with the prompt "a photo of a <category>" and the rest of the layers are randomly initialized. Initializing prompts with a similar template in all layers leads to a lower performance, suggesting redundancy as the prompts learn hierarchically different contextual concepts in different layers. Random initialization provides, however, competitive performance.

Figure 7:
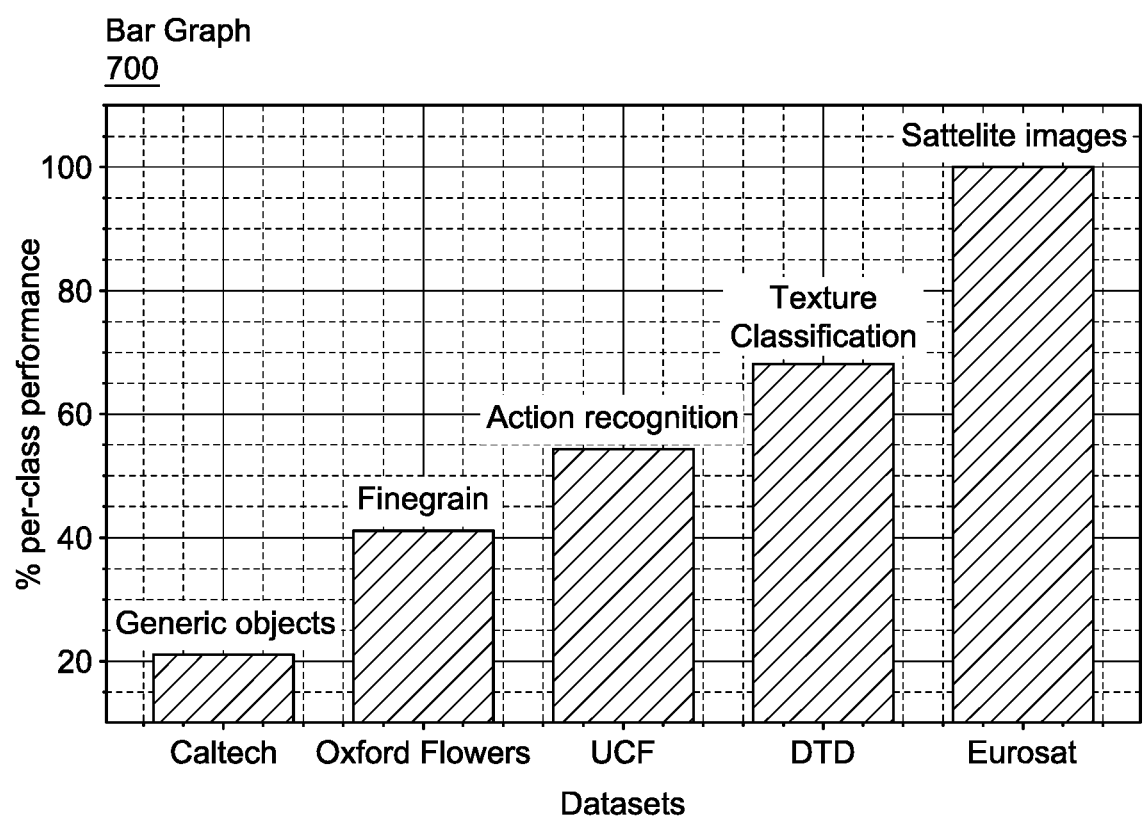
FIG. 7 shows a bar graph of a per-class accuracy increase for select datasets achieved by the multi-modal prompt learning framework, according to certain embodiments.

FIG. 7 shows a bar graph 700 of a per-class accuracy increase for select datasets achieved by the multi-modal prompt learning framework, according to certain embodiments. The multi-modal prompt learning framework 200 achieves significant performance gains as compared to Co-CoOp across various different datasets. In particular, the per-class accuracy increase is larger for datasets that have large distribution shifts from the pre-training dataset of CLIP. In addition, datasets that have larger diversity see greater increases.

The multi-modal deep prompting architecture of the multi-modal prompt learning framework 200 along with the vision-language coupling function 250 constitute a greater number of learnable parameters as compared to CoOp and Co-CoOp. For a better comparison of accuracy, a heavier Co-CoOp model is used, which matches the parameter count of the multi-modal prompt learning framework 200 by stacking additional layers in a Meta-Net block. The results are summarized in Table 6 below.

TABLE 6

| Method | Base Acc. | Novel Acc. | Harmonic Mean |
|---|---|---|---|
| Co-CoOp | 80.47 | 71.69 | 75.83 |
| Heavier Co-CoOp | 80.14 | 72.02 | 75.86 |
| MaPLe | 82.28 | 75.14 | 78.55 |

Table 6 indicates that the effectiveness of the multi-modal prompting in the multi-modal prompt learning framework 200 is not simply due to the increased number of parameters.

The multi-modal prompt learning framework 200 also shows greater computational complexity performance. The multi-modal prompt learning framework 200 is compared to other prompting approaches, and the results are summarized in Table 7 below.

TABLE 7

| Method | GFLOPS | % GFLOPS w.r.t. Co-CoOp | FPS BS = 1 | FPS BS = 4 | FPS BS = 100 | BS Overhead |
|---|---|---|---|---|---|---|
| CoOp | 166.8 | 0.0 | 13.8 | 55.3 | 1353.0 | No |
| Co-CoOp | 166.8 | 0.0 | 13.9 | 14.9 | 15.1 | Yes |
| Independent V-L Prompting | 167.1 | 0.2 | 14.1 | 56.7 | 1350.0 | No |
| MaPLe | 167.0 | 0.1 | 14.1 | 56.3 | 1365.0 | No |

Although the multi-modal prompt learning framework 200 utilizes multi-modal prompts, its overall floating point operations (FLOPS) is only 0.1% greater than CoOp and Co-CoOp and is comparable to independent vision-language prompting. In terms of inference speed, Co-CoOp is significantly slower and the frames per second (FPS) remains constant as the batch size (BS) increases. In contrast, the multi-modal prompt learning framework 200 has no such overhead and provides much better inference and training speeds. Further, the multi-modal prompt learning framework 200 provides better convergence, as it only requires half of the training epochs as compared to Co-CoOp (i.e., 5 epochs for the multi-modal prompt learning framework 200 vs 10 epochs needed for Co-CoOp).

Figure 8:
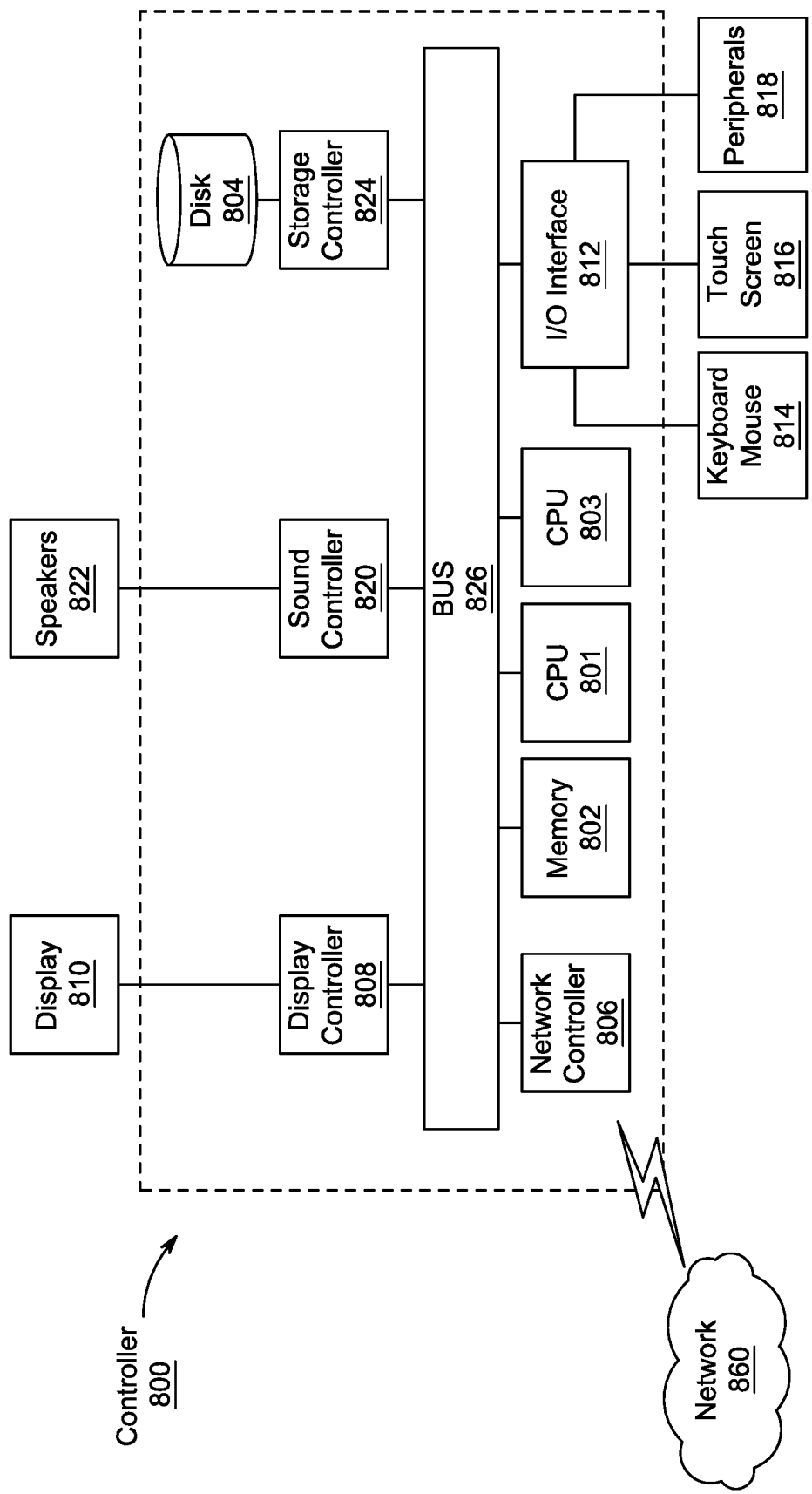
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 800 is described representative of a computer, operating the multi-modal prompt learning framework 200 of FIG. 2, which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
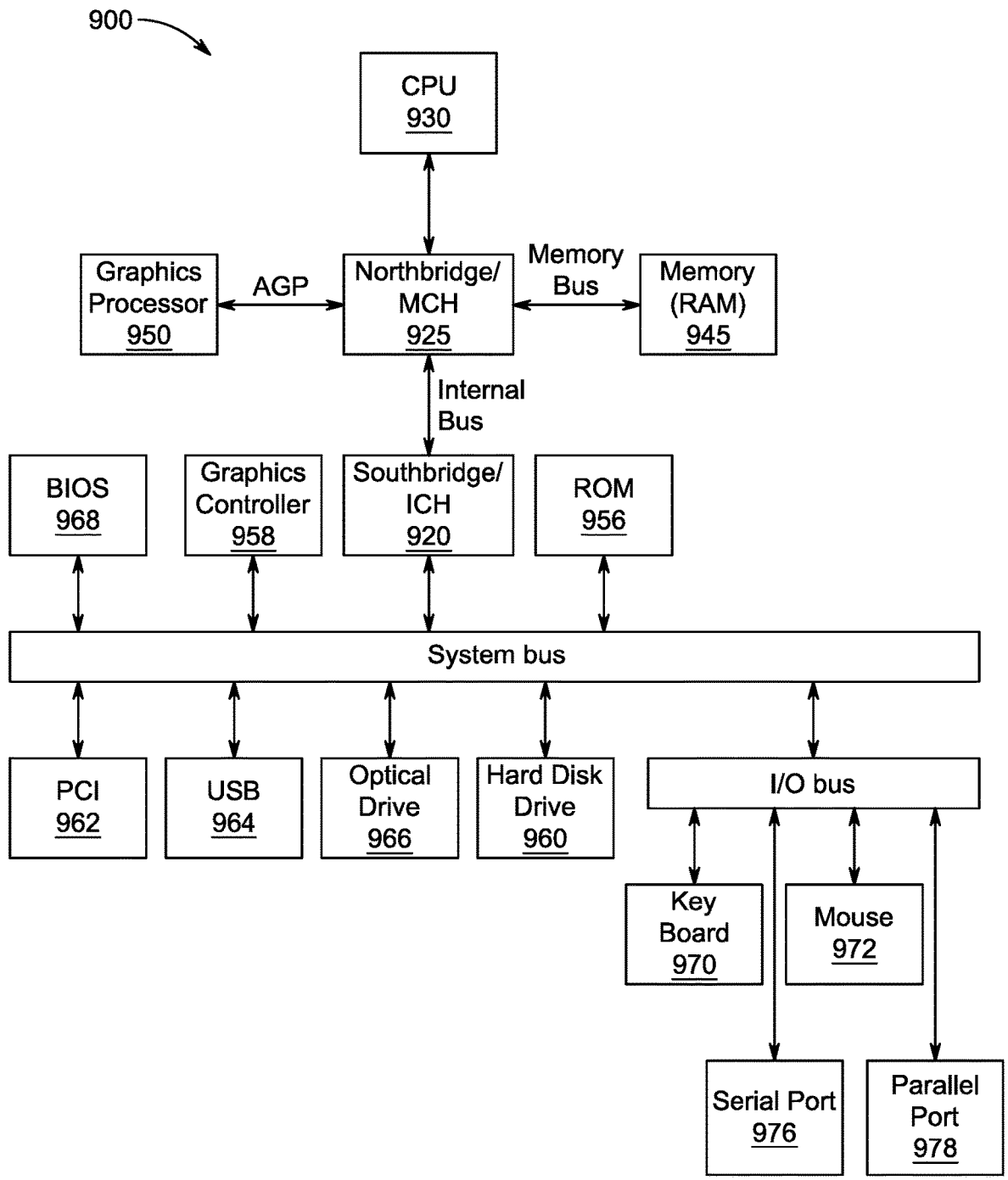
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
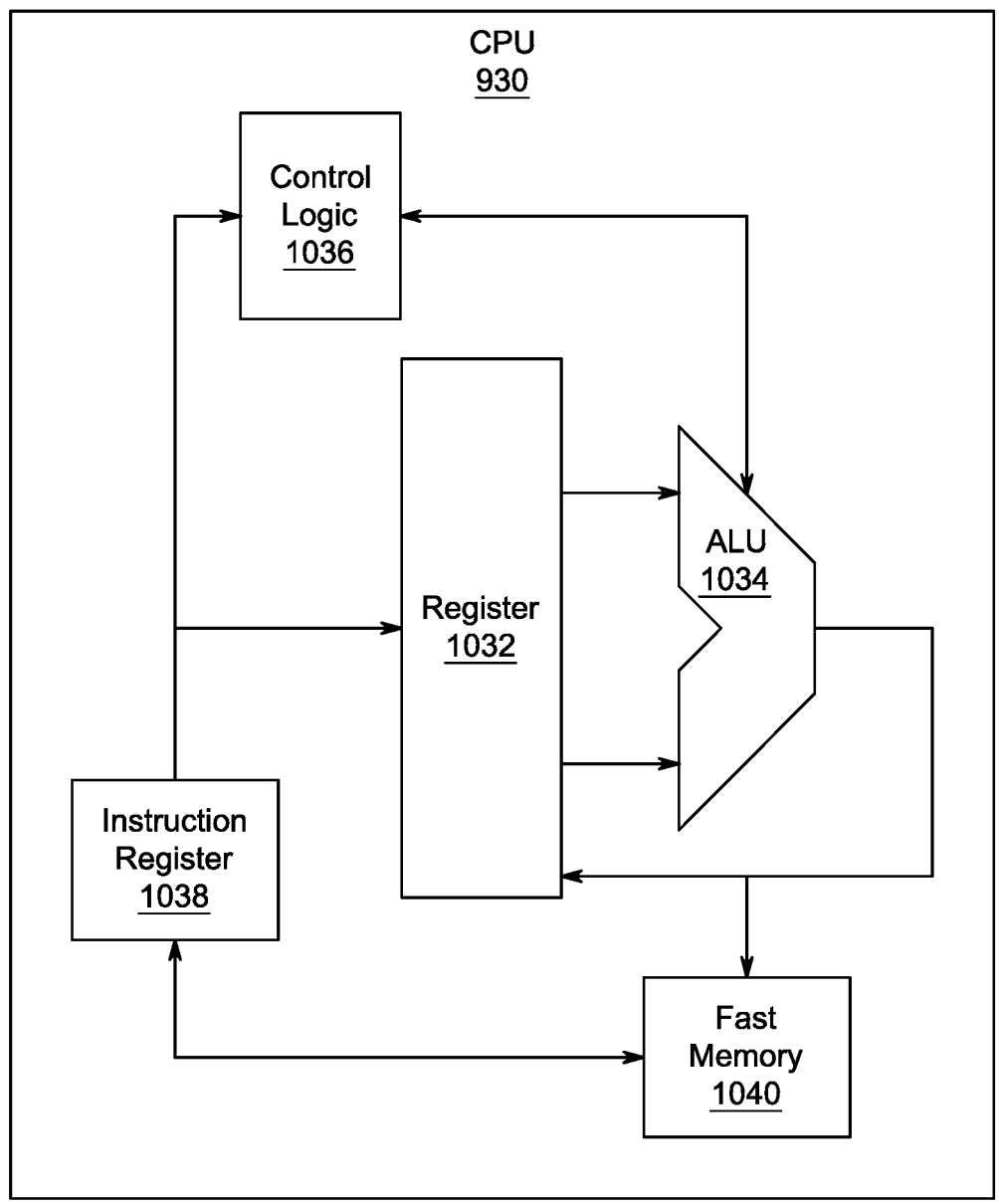
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on computational requirements.

Figure 11:
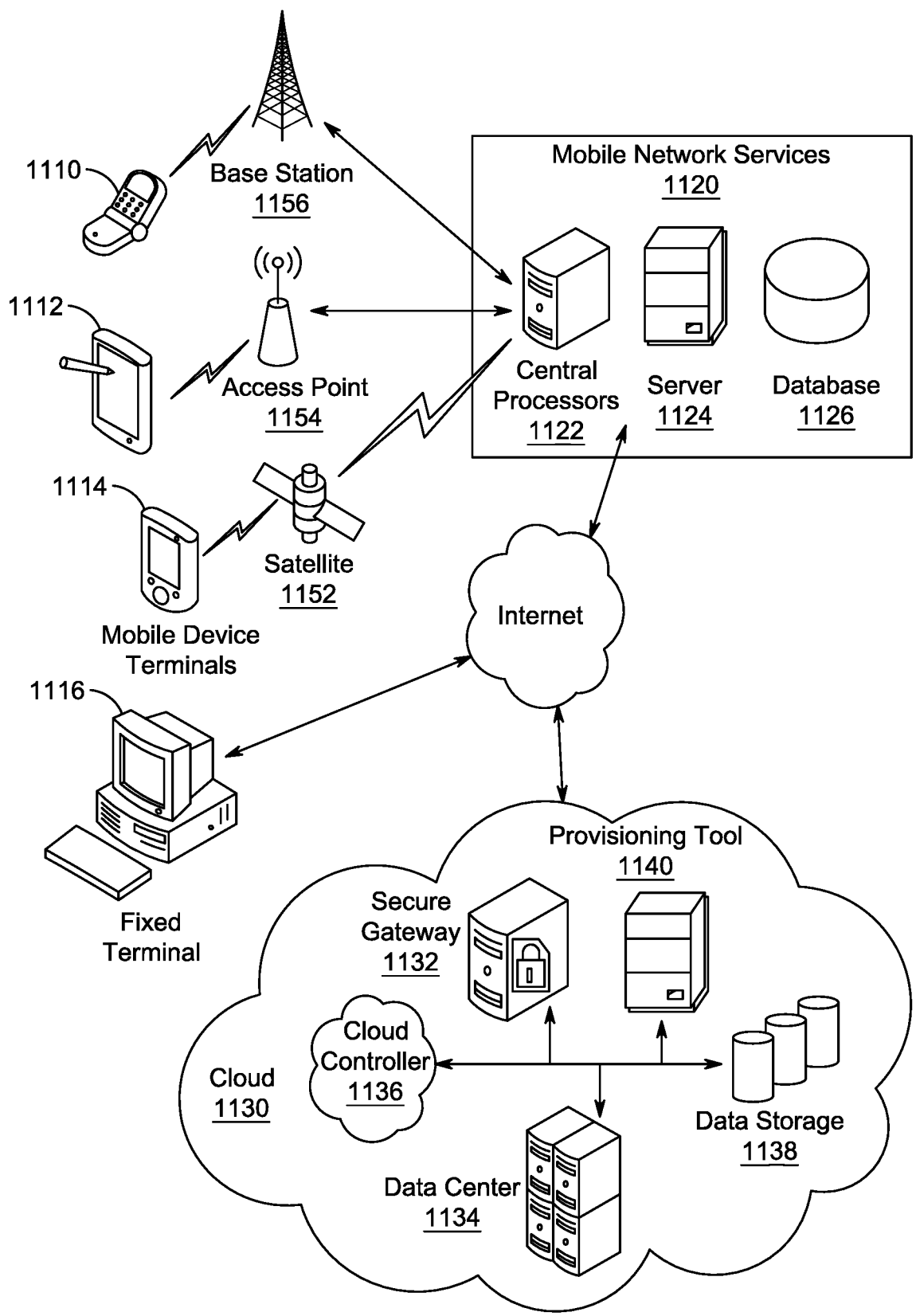
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Figure 12:
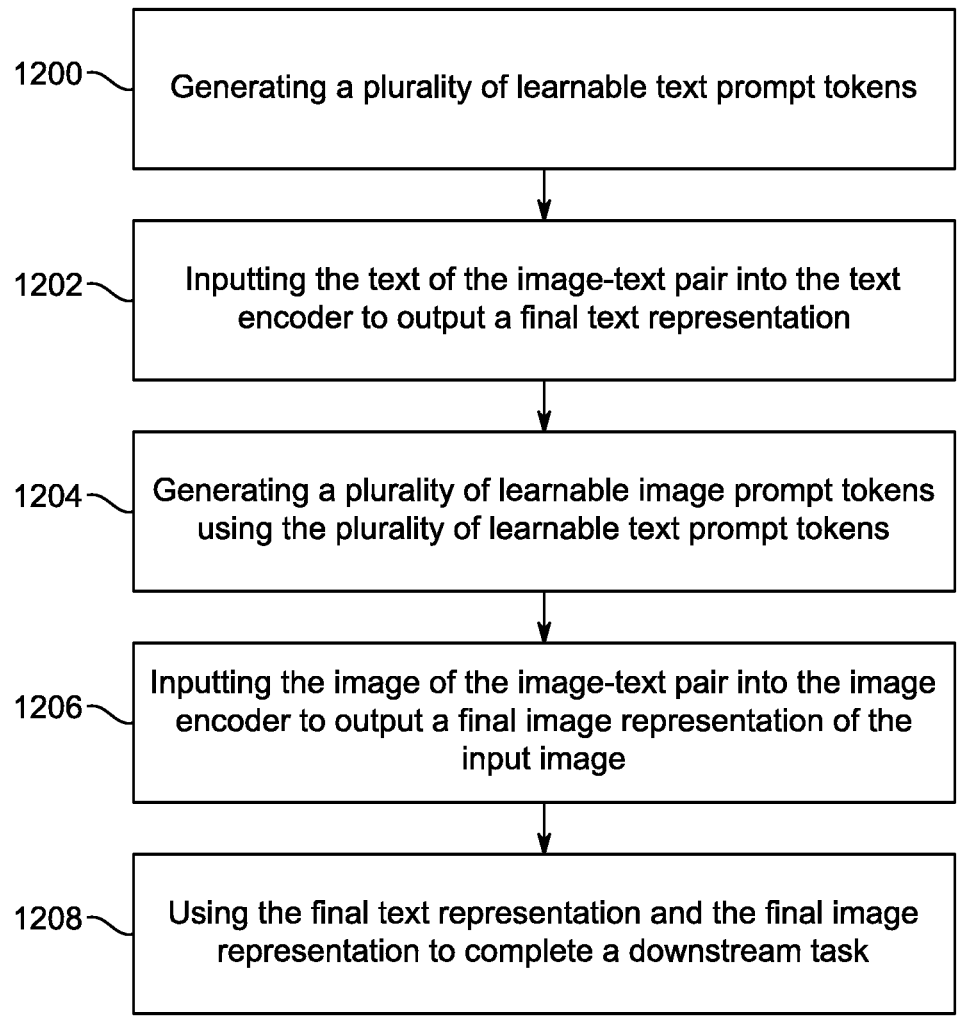
FIG. 12 illustrates an exemplary method according to certain embodiments.

FIG. 12 illustrates an exemplary method according to certain embodiments. The method can be performed by a computer. For example, a server computer can receive image-text pairs from external computers and instructions to perform a downstream task using the image-text pairs. One such example could include receiving a plurality of image-text pairs, and instructions to determine how many images of dogs there are.

Prior to performing the steps of the method below, the server computer can obtain a neural network comprising an image encoder and a text encoder. The neural network can implement a vision-language model, such as CLIP, wherein the text encoder forms the language branch of the vision-language model and the image encoder forms the vision branch of the vision-language model. Both the image encoder and the text encoder can comprise a total of K transformer layers. The image encoder and the text encoder can have a specific depth J<K, where after the specific depth is reached, the encoders no longer concatenate embeddings with learnable prompt tokens. In addition, the server computer can obtain an image-text-pair. From the above example, a server computer can receive text-image pairs from external computers. Examples can include a picture of a cat along with the text "a photo of a cat." In some examples, the server computer can receive instructions to perform a downstream task, such as an image recognition, using the received image-text pair.

At block 1200, the method can include generating a plurality of learnable text prompt tokens. An example learnable text prompt tokens can be "a photo of a <category>" and the goal of such a text prompt can be to learn the category.

At block 1202, the method can include inputting the text of the image-text pair into the text encoder. The text (e.g., the input text 210 of FIG. 2) can be tokenized and projected to a plurality of word embeddings (e.g., the word embeddings 212A1-212N1 of FIG. 2). The word embeddings can be concatenated with one or more of a plurality of learnable text prompt tokens, such as the learnable text prompt tokens 218A and 218B of FIG. 2. The word embeddings and the learnable text prompt tokens can be fed through the text transformer layers of the text encoder, and the output of the text transformer layer can be fed into the subsequent text transformer layer until a specific depth is reached. After the specific depth is reached, the remaining transformer layers can process the word embeddings, and the final transformer layer can output a final text representation of the input text. The final text representation can be generated using a text projection function that maps the embeddings to a common visual-language latent embedding space.

At block 1204, the method can include generating a plurality of learnable image prompt tokens using the plurality of learnable text prompt tokens. To promote mutual synergy, the learnable text prompt tokens can be fed as input to a vision-language coupling function (e.g., the vision-language coupling functions 250A-250J of FIG. 2) that maps inputs of a first dimensionality to outputs of a second dimensionality. The learnable image prompt tokens can be generated for each layer of the image encoder up to the specific depth.

At block 1206, the method can include inputting the image of the image-text pair into the image encoder. The image is split into a plurality of patch embeddings, and a learnable class token can be appended to the plurality of patch embeddings. In addition, the image encoder can concatenate the plurality of patch embeddings and the learnable class token with one or more of a plurality of learnable text prompt tokens. Similar to the text encoder, the image encoder can input the concatenation into the image transformer layers of the image encoder, and feed the output of the image transformer layer to the subsequent image transformer layer until the specific depth is reached. The remaining image transformer layers can then process the patch embeddings and the appended learnable tokens, with the final image transformer layer outputting a final image representation of the input image by using an image projection function that maps the final learnable class token to the common visual-language latent embedding space.

At block 1208, the final text representation and the final image representation can be used to complete a downstream task. For example, image recognition tasks can be completed using the final representations of the inputs. One specific example of this is zero-shot classification, in which a cosine similarity score of a plurality of input image-text pairs can be used to generate a prediction on which image of the plurality of input image-text pairs is likely to fit the desired class. Such a prediction can be used to modify the parameters of the multi-modal prompt learning framework, such as the learnable class token or the learnable prompt tokens. One example of this includes gradient backpropagation, in which a loss of a loss function (e.g., cross-entropy, Hinge loss, etc.) is computed, and the gradient of said loss function is backpropagated and used to update the parameters.

Numerous modifications and variations of the present disclosure are possible in light of the above teachings. It is therefore to be understood that within the scope of the appended claims, the invention may be practiced otherwise than as specifically described herein.

The invention claimed is:

1. A method for using a neural network to perform an image recognition task, comprising:
   obtaining a pretrained vision-language model that includes a language branch and a vision branch, the vision-language model being a neural network that was pretrained using a web-scale training dataset;
   simultaneously learning prompts for both the language and vision branches of the vision-language model, so as to fine tune the vision-language model to the image recognition task; and
   applying a task input to the fine tuned vision-language model to perform the image recognition task on the task input,
   wherein the step of simultaneously learning the prompts further comprises:
      receiving an image-text pair and a ground truth value corresponding to the image-text pair,
      initializing a plurality of learnable text prompt tokens,
      inputting a text of the image-text pair into a text encoder included in the language branch, wherein the text is tokenized and projected to a plurality of word embeddings, and wherein the text encoder outputs a final text representation based on the plurality of word embeddings and the plurality of learnable text prompt tokens,
      generating a plurality of learnable image prompt tokens using the plurality of learnable text prompt tokens,
      inputting an image of the image-text pair into an image encoder included in the vision branch, wherein the image is split into a plurality of patch embeddings, wherein a learnable class token is appended to the plurality of patch embeddings, and wherein the image encoder outputs a final image representation based on the plurality of patch embeddings, the learnable class token, and the plurality of learnable image prompt tokens,
      using the final text representation and the final image representation to perform image classification to generate a prediction, and
      based on a comparison between the generated prediction and the ground truth value, updating the plurality of learnable text prompt tokens, the plurality of learnable image prompt tokens, and the learnable class token,
   wherein the text encoder comprises K total number of text transformer layers, and wherein the image encoder comprises K total number of image transformer layers, wherein, at each text transformer layer up to a specific depth less than the total number of image transformer layers, the text encoder concatenates the plurality of word embeddings received as input to the text transformer layer with at least one of the plurality of learnable text prompt tokens, and wherein, at each image transformer layer up until the specific depth, the image encoder concatenates the plurality of patch embeddings received as input to the image transformer layer with at least one of the plurality of learnable image prompt tokens, and wherein during the step of simultaneously learning the prompts, only the plurality of learnable text prompt tokens, the plurality of learnable image prompt tokens, and the learnable class token are updated, while other parts of the vision-language model are kept frozen.

2. The method of claim 1, wherein the text encoder forms the language branch of the vision-language model, and wherein the image encoder forms the vision branch of the vision-language model.

3. The method of claim 2, wherein the vision-language model comprises a contrastive language-image pre-training (CLIP) neural network.

4. The method of claim 1, wherein generating the plurality of learnable image prompt tokens using the plurality of learnable text prompt tokens further comprises:

for each learnable image prompt token of the plurality of learnable image prompt tokens, inputting one corresponding learnable text prompt token of the plurality of learnable text prompt tokens into a vision-language projection coupling function to generate the learnable image prompt token.

5. The method of claim 4, wherein the vision-language projection coupling function comprises a linear layer that maps inputs of a first dimensionality to outputs of a second dimensionality.

6. The method of claim 1, wherein the generated prediction includes a computation of a cosine similarity score.

7. The method of claim 6, further comprising:
computing a loss between the generated prediction and the ground truth value using a loss function;
computing a gradient of the loss function; and
backpropagating the gradient to update the plurality of learnable text prompt tokens, the plurality of learnable image prompt tokens, and the learnable class token.

8. The method of claim 7, wherein the loss function is a cross-entropy loss function or a Hinge loss function.

9. The method of claim 1, wherein the plurality of learnable text prompt tokens comprise natural language.

10. The method of claim 1, wherein the final text representation and the final image representation are stored in a representation table.

11. The method of claim 1, wherein the final text representation and the final image representation are elements of a common vision-language latent embedding space.

12. The method of claim 1, wherein the image classification comprises zero-shot classification.

13. The method of claim 1, wherein generating the plurality of learnable image prompt tokens using the plurality of learnable text prompt tokens further comprises:

for each learnable image prompt token of the plurality of learnable image prompt tokens, inputting one corresponding learnable text prompt token of the plurality of learnable text prompt tokens into a vision-language projection coupling function to generate the learnable image prompt token;

wherein the vision-language projection coupling function comprises a linear layer that maps inputs of a first dimensionality to outputs of a second dimensionality; and wherein the downstream task is zero-shot classification, and wherein the generated prediction includes a computation of a cosine similarity score;

computing a loss between the generated prediction and the ground truth value using a cross-entropy loss function or a Hinge loss function;

computing a gradient of the loss function; and backpropagating the gradient to update the plurality of learnable text prompt tokens, the plurality of learnable image prompt tokens, and the learnable class token.

14. A non-transitory computer readable medium having instructions stored therein that, when executed by one or more processors, cause the one or more processors to perform a method for using a neural network to perform an image recognition task, the method comprising:

obtaining a pretrained vision-language model that includes a language branch and a vision branch, the vision-language model, the vision-language model being a neural network that was pretrained using a web-scale training dataset;

simultaneously learning prompts for both the language and vision branches of the vision-language model, so as to fine tune the vision-language model to the image recognition task; and applying a task input to the fine tuned vision-language model to perform the image recognition task on the task input, wherein the step of simultaneously learning the prompts further comprises:

receiving an image-text pair and a ground truth value corresponding to the image-text pair, initializing a plurality of learnable text prompt tokens, inputting a text of the image-text pair into a text encoder included in the language branch, wherein the text is tokenized and projected to a plurality of word embeddings, and wherein the text encoder outputs a final text representation based on the plurality of word embeddings and the plurality of learnable text prompt tokens, generating a plurality of learnable image prompt tokens using the plurality of learnable text prompt tokens, inputting an image of the image-text pair into an image encoder included in the vision branch, wherein the image is split into a plurality of patch embeddings, wherein a learnable class token is appended to the plurality of patch embeddings, and wherein the image encoder outputs a final image representation based on the plurality of patch embeddings, the learnable class token, and the plurality of learnable image prompt tokens, using the final text representation and the final image representation to perform image classification to generate a prediction, and based on a comparison between the generated prediction and the ground truth value, updating the plurality of learnable text prompt tokens, the plurality of learnable image prompt tokens, and the learnable class token, wherein the text encoder comprises K total number of text transformer layers, and wherein the image encoder comprises K total number of image transformer layers, wherein, at each text transformer layer up to a specific depth J less than the total number of image transformer layers, the text encoder concatenates the plurality of word embeddings received as input to the text transformer layer with at least one of the plurality of learnable text prompt tokens, and wherein, at each image transformer layer up until the specific depth, the image encoder concatenates the plurality of patch embeddings received as input to the image transformer layer with at least one of the plurality of learnable image prompt tokens, and wherein during the step of simultaneously learning the prompts, only the plurality of learnable text prompt tokens, the plurality of learnable image prompt tokens, and the learnable class token are updated, while other parts of the vision-language model are kept frozen.

15. The non-transitory computer readable medium of claim 14, wherein the neural network implements a contrastive language-image pre-training (CLIP) neural network, wherein the text encoder forms the language branch of the CLIP neural network, and wherein the image encoder forms the vision branch of the CLIP neural network.

16. The non-transitory computer readable medium of claim 14, wherein generating the plurality of learnable image prompt tokens using the plurality of learnable text prompt tokens comprises for each learnable image prompt token of the plurality of learnable image prompt tokens, inputting one corresponding learnable text prompt token of the plurality of learnable text prompt tokens into a vision-language projection coupling function to generate the learnable image prompt token, wherein the vision-language projection coupling function comprises a linear layer that maps inputs of a first dimensionality to outputs of a second dimensionality.

17. The non-transitory computer readable medium of claim 14, wherein the generated prediction includes a computation of a cosine similarity score computing a loss between the generated prediction and the ground truth value using a loss function, the method further comprising:
   computing a gradient of the loss function; and
   backpropagating the gradient to update the plurality of learnable text prompt tokens, the plurality of learnable image prompt tokens, and the learnable class token.

18. The non-transitory computer readable medium of claim 14, wherein the plurality of learnable text prompt tokens comprise natural language.

\* \* \* \* \*